United States Patent
Feiertag et al.

(10) Patent No.: US 6,772,203 B1
(45) Date of Patent: Aug. 3, 2004

(54) UPDATING DATA OBJECTS FOR DYNAMIC APPLICATION CACHING

(75) Inventors: Michael A. Feiertag, San Francisco, CA (US); Daniel S. Jordan, San Francisco, CA (US); Sudhir Mohan, Saratoga, CA (US); David M. Hoffman, San Jose, CA (US); Robert M. Tesh, Cupertino, CA (US)

(73) Assignee: Pivia, Inc., Cupertino, CA (US)

( * ) Notice: Subject to any disclaimer, the term of this patent is extended or adjusted under 35 U.S.C. 154(b) by 265 days.

(21) Appl. No.: 10/143,041

(22) Filed: May 9, 2002

Related U.S. Application Data

(63) Continuation-in-part of application No. 09/312,308, filed on May 14, 1999, now Pat. No. 6,505,230.

(51) Int. Cl.[7] ............................................. G06F 13/00
(52) U.S. Cl. ...................................... 709/219; 711/133
(58) Field of Search ................................. 709/200, 203, 709/219; 370/429; 717/118; 711/100, 117, 118, 133, 136

(56) References Cited

U.S. PATENT DOCUMENTS

| | | | | |
|---|---|---|---|---|
| 5,991,306 A | * | 11/1999 | Burns et al. | 370/429 |
| 6,157,942 A | * | 12/2000 | Chu et al. | 709/203 |
| 6,324,182 B1 | * | 11/2001 | Burns et al. | 370/429 |
| 6,324,685 B1 | * | 11/2001 | Balassanian | 717/118 |

* cited by examiner

*Primary Examiner*—Robert B. Harrell
(74) *Attorney, Agent, or Firm*—Blakely Sokoloff Taylor & Zafman LLP; Judith A. Szepesi

(57) ABSTRACT

In an embodiment, a method comprises receiving a hit rate and a change rate for a data object stored in a cache. The method also includes updating a time-to-live period for the data object stored in the cache based on the hit rate and the change rate for the data object.

52 Claims, 8 Drawing Sheets

UPDATING DATA OBJECTS FOR DYNAMIC APPLICATION CACHING

RELATED CASES

The present application is a Continuation in Part of U.S. patent application Ser. No. 09/312,308, filed May 14, 1999, entitled "Client-Server Independent Intermediary Mechanism", now U.S. Pat. No. 6,505,230.

FIELD OF THE INVENTION

The invention relates to the field of data retrieval and communications. More specifically, the invention relates to updating data objects for dynamic application caching for data communications.

BACKGROUND OF THE INVENTION

The competition among web applications on the Internet is continuing to increase. To provide economic value, web applications must offer content that is current, compelling, targeted to user interests and needs, and rich in information. Accordingly, web sites are providing dynamic content to meet such demands. However, as web sites transition from static to dynamic content, the business tension between the need for improved website performance and sky-rocketing costs of web operations continues to mount. In particular, many web sites face the challenge of expanding to include more personalized, dynamic content, improving performance, while simultaneously reducing the costs of web operations. The explosion of dynamic content, personalization and more sophisticated content management applications is significantly increasing the value of each web site browsing experience. However, such features for a web site are also bogging down backend systems, thereby creating performance, scaling, and cost headaches.

A current approach to such problems includes a never-ending build-out of additional servers and software. In addition to the new capital equipment, such an approach typically requires hiring of extra staff to manage the new web infrastructure.

Another typical approach to such problems includes conventional caches that store and retrieve copies of static objects, such as bitmaps and pictures. However, because web sites are gravitating to more dynamic content (as described above), such conventional caches are not able to cache most web pages. Moreover, these conventional caches associate time-to-live periods for content elements that have been cached. Disadvantageously, these conventional caches required a specified fixed time-to-live period for each content element. This is time consuming, inaccurate, puts unnecessary load on a web site, and requires recoding with each change in the web pages.

SUMMARY OF THE INVENTION

A method, apparatus and system for updating data objects for dynamic application caching are described. In an embodiment, a method comprises receiving a hit rate and a change rate for a data object stored in a cache. The method also includes updating a time-to-live period for the data object stored in the cache based on the hit rate and the change rate for the data object.

BRIEF DESCRIPTION OF THE DRAWINGS

Embodiments of the invention may be best understood by referring to the following description and accompanying drawings, which illustrate such embodiments. The numbering scheme for the Figures included herein are such that the leading number for a given element in a Figure is associated with the number of the Figure. For example, system 100 can be located in FIG. 1A. However, element numbers are the same for those elements that are the same across different Figures. In the drawings.

DETAILED DESCRIPTION

Figure 1A:
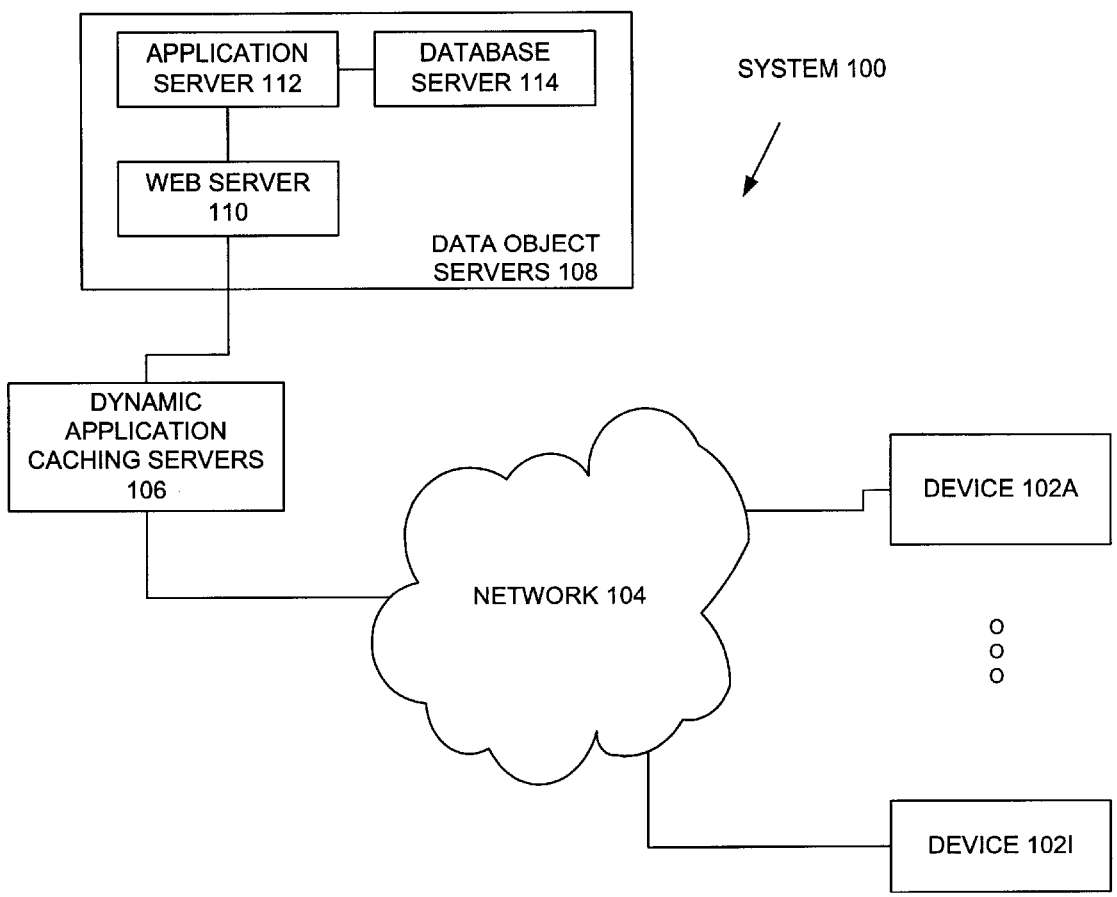
FIG. 1A is block diagram illustrating a network including one embodiment of the present invention.

A method and apparatus for updating cache objects for dynamic application caching are described. In the following description, for purposes of explanation, numerous specific details are set forth in order to provide a thorough understanding of the present invention. It will be evident, however, to one skilled in the art that the present invention may be practiced without these specific details.

In one embodiment, a method comprises receiving, at a cache server, a request for a data object stored in a data object server. The method includes determining whether a time-to-live period associated with a copy of the data object stored in the cache server has expired. The time-to-live period is based on a hit rate, a change rate, and a freshness for the data object. The method includes transmitting the data object stored in the cache server in response to a request, if the time-to-live period has not expired.

In an embodiment, a method comprises determining a rate that requests for a data object are transmitted to a data object server. This is referred to as the "hit rate." The method also includes determining a rate that indicates how often the data object is updated within a the object server. This is referred to as the "change rate." Moreover, a percentage of the data objects served by the cache that are identical to the data object in the data object server is determined. This is referred to as the "freshness" of the data being served. The method also includes generating a time-to-live period for the data object stored in the cache based on the hit rate, change rate, and freshness. The time-to-live period is also based on the relationship of the actual freshness of all data served with a promised freshness rate. This type of predictive modeling attempts to determine how often to update the contents of the cache, based on the frequency of access, frequency of updates in the object server, and other factors.

In one embodiment, an apparatus comprises a database to store a copy of a data object from a data object server, and to associate a time-to-live period with the copy of the data object. The apparatus also includes an inline cache server coupled to data object server. The inline cache server processes requests for data objects destined for the data object server. The inline cache server serves the copy of the data object if the time-to-live period has not expired. The inline cache server updates the time-to-live period for the data object based on a hit rate and a change rate for the data object.

As will be described in more detail below, embodiments of the present invention allow cache servers to return a data object, such as a portion of a web page, back to a requesting client computer, without putting a load on the data object servers that normally serve the data object. In an embodiment, a time-to-live period for a given data object stored in the cache is generated based on a hit rate and a change rate for the data object. In other words, embodiments of the present invention generate a time-to-live period for the given data object stored in the cache servers based on a rate that is proportional to (1) how many requests for the data object is expected to be received, (2) the probability that there is going to be a change to the data object, and (3) the freshness of all objects served to date compared to promised freshness. Accordingly, embodiments of the present invention allow for effective caching of data objects by basing the time-to-live periods of these data objects on distribution of these objects.

System Description

FIG. 1A is block diagram illustrating a network including one embodiment of the present invention. System 100 includes data object servers 108A–E and associated dynamic application cache servers 106A–D. However, any number of such data object servers 108 and associated dynamic application cache servers 106 may be included within system 100.

As shown, system 100 includes devices 102A–102I, which are coupled to network 104. In an embodiment, devices 102A–102I are computing devices, such as client computers. For example, devices 102A–102I can include a number of different notebook or desktop computers, and network 104 comprises the Internet. In an alternative embodiment, network 104 comprises an Intranet.

Additionally, a dynamic application cache server 106 is also coupled to network 104, while data object server 108 is coupled to dynamic application cache server 106. Accordingly, in an embodiment, communications between network 104 and data object server 108 pass through dynamic application cache server 106. As will be described in more detail below, in an embodiment, dynamic application cache server 106 stores a copy of a data object that is stored in the data object server 108. In one such embodiment, the copy of the data object includes data and logic representative of the data object, such that when the data object is requested, the data object can be reconstructed and served to a requesting device 102 based on this data and logic. Moreover, in one embodiment, dynamic application cache server 106 stores a time-to-live period or expiration time for this copy of the data object. Accordingly, if the data object is being requested from data object server 108 by one of devices 102 and a live copy of this data object is stored in dynamic application cache server 106, dynamic application cache server 106 transmits the copy of the data object to the requesting device 102 without retrieving the data object from data object server 108. This decreases the load on data object server 108.

While different embodiments of the present invention could have different types of communication protocols among devices 102, dynamic application cache server 106 and data object server 108, in an embodiment, the communication protocol is the HyperText Transfer Protocol (HTTP). Moreover, in one such embodiment, the communication protocol is upgraded to Secure-HTTP (HTTPS) to allow for increased security.

In one embodiment, network 104 is a local area network (LAN). In another embodiment, network 104 is a wide area network (WAN). In one embodiment, network 104 is the Internet. Further, network 104 can be a combination of different networks that provide communication among devices 102, dynamic application cache server 106 and data object server 108. Moreover, to allow for increased security for communications among devices 102, dynamic application cache server 106 and data object server 108, virtual private networks (VPNs) within network 104 can be established between a given device 102 and dynamic application cache server 106.

In one embodiment, data object server 108 comprises web server 110, application server 112, and database 114. The web server 110 receives requests and serves data to requesting users. The application server 112 handles application operations between users and backend business applications or databases 114. Application servers are typically used for complex transaction-based applications. To support high-end needs, an application server often includes built-in redundancy, monitors for high-availability, high performance distributed application services and support for complex database access.

Figure 1B:
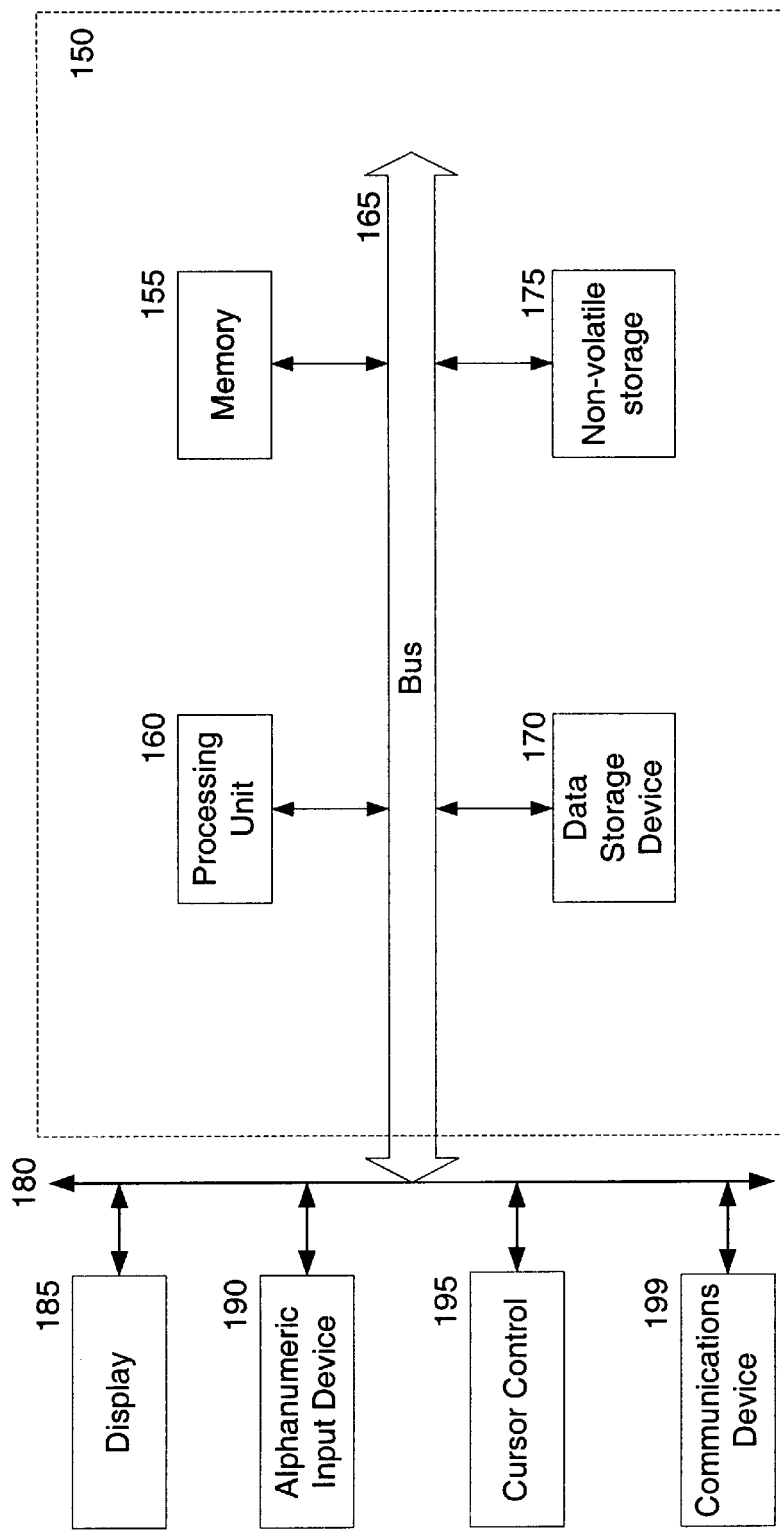
FIG. 1B illustrates a block diagram of a system for updating data objects for dynamic application caching, according to one embodiment of the present invention.

FIG. 1B illustrates a block diagram of a computer system that may be used with the present invention, according to one embodiment of the present invention. Although described in the context of system 120, the present invention may be implemented in any suitable computer system. It will be apparent to those of ordinary skill in the art, however that other alternative systems of various system architectures may also be used.

The data processing system illustrated in FIG. 1B includes a bus or other internal communication means 115 for communicating information, and a processor 110 coupled to the bus 115 for processing information. The system further comprises a random access memory (RAM) or other volatile storage device 150 (referred to as memory), coupled to bus 115 for storing information and instructions to be executed by processor 110. Main memory 150 also may be used for storing temporary variables or other intermediate information during execution of instructions by processor 110. The system also comprises a read only memory (ROM) and/or static storage device 120 coupled to bus 115 for storing static information and instructions for processor 110, and a data storage device 125 such as a magnetic disk or optical disk and its corresponding disk drive. Data storage device 125 is coupled to bus 115 for storing information and instructions.

The system may further be coupled to a display device 170, such as a cathode ray tube (CRT) or a liquid crystal display (LCD) coupled to bus 115 through bus 165 for displaying information to a computer user. An alphanumeric input device 175, including alphanumeric and other keys, may also be coupled to bus 115 through bus 165 for communicating information and command selections to processor 110. An additional user input device is cursor control device 180, such as a mouse, a trackball, stylus, or cursor direction keys coupled to bus 115 through bus 165 for communicating direction information and command selections to processor 110, and for controlling cursor movement on display device 170.

Another device, which may optionally be coupled to computer system 100, is a communication device 190 for accessing other nodes of a distributed system via a network. The communication device 190 may include any of a number of commercially available networking peripheral devices such as those used for coupling to an Ethernet, token ring, Internet, or wide area network. The communication device 190 may further be a null-modem connection, or any other mechanism that provides connectivity between the computer system 100 and the outside world. Note that any or all of the components of this system illustrated in FIG. 1B and associated hardware may be used in various embodiments of the present invention.

It will be appreciated by those of ordinary skill in the art that any configuration of the system may be used for various purposes according to the particular implementation. The control logic or software implementing the present invention can be stored in main memory 150, mass storage device 125, or other storage medium locally or remotely accessible to processor 110.

It will be apparent to those of ordinary skill in the art that the system, method, and process described herein can be implemented as software stored in main memory 150 or read only memory 120 and executed by processor 110. This control logic or software may also be resident on an article of manufacture comprising a computer readable medium having computer readable program code embodied therein and being readable by the mass storage device 125 and for causing the processor 110 to operate in accordance with the methods and teachings herein.

The present invention may also be embodied in a special purpose appliance including a subset of the computer hardware components described above. For example, the appliance may include a processor 110, a data storage device 125, a bus 115, and memory 150, and communications mechanism 190. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 110. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Figure 2A:
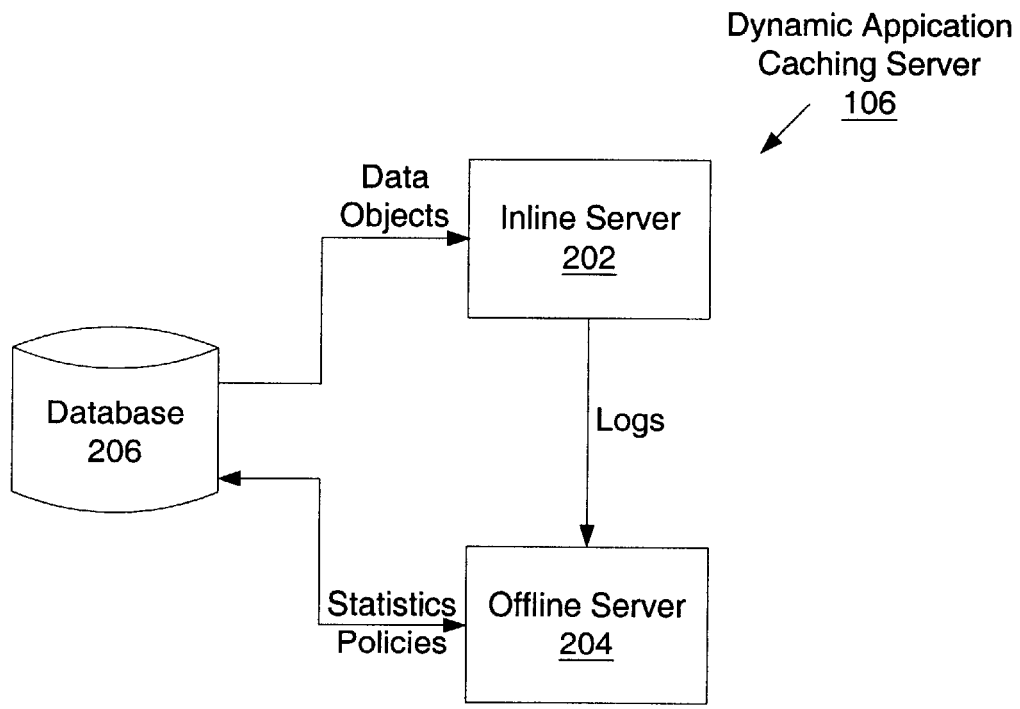
FIG. 2A illustrates a more detailed block diagram of a dynamic application cache server, according to one embodiment of the present invention.

FIG. 2A illustrates a more detailed block diagram of dynamic application cache server 106, according to one embodiment of the present invention. As shown, dynamic application cache server 106 comprises inline server 202, offline server 204, file system 203 and database 205. For sake of simplicity, inline server 202 and offline server 204 are illustrated as single servers. However, in one embodiment, inline server 202 is representative of a number of servers that can process the requests for data objects being received from a number of different requesting units as well as update time-to-live periods for such data objects. In an embodiment, offline server 204 is representative of a number of different servers that perform a policy analysis to determine time-to-live for the copies of the data objects in cache 206.

As will be described in more detail below, in an embodiment, inline server 202 is coupled to receive and process requests for a data object (destined for data object server 108). The inline server 202 determines whether the requested data object is in file system 203. If so, and if the time-to-live associated with the object has not yet expired, the inline server 202 responds to the data request. Otherwise, the inline server 202 proxies the request to the data server (not shown). In an embodiment, inline server 202 updates a time-to-live period, or expiration time, for the copy of the data object stored in file system 203, in database 205. In an embodiment, offline server 204 generates a policy on which the time-to-live periods are based, as will be described in more detail below. In an embodiment, file system 203 stores the copies of the data objects, and database 205 stores the associated meta-data such as the time-to-live periods for such copies, and the policy for the time-to-live periods.

Figure 2B:
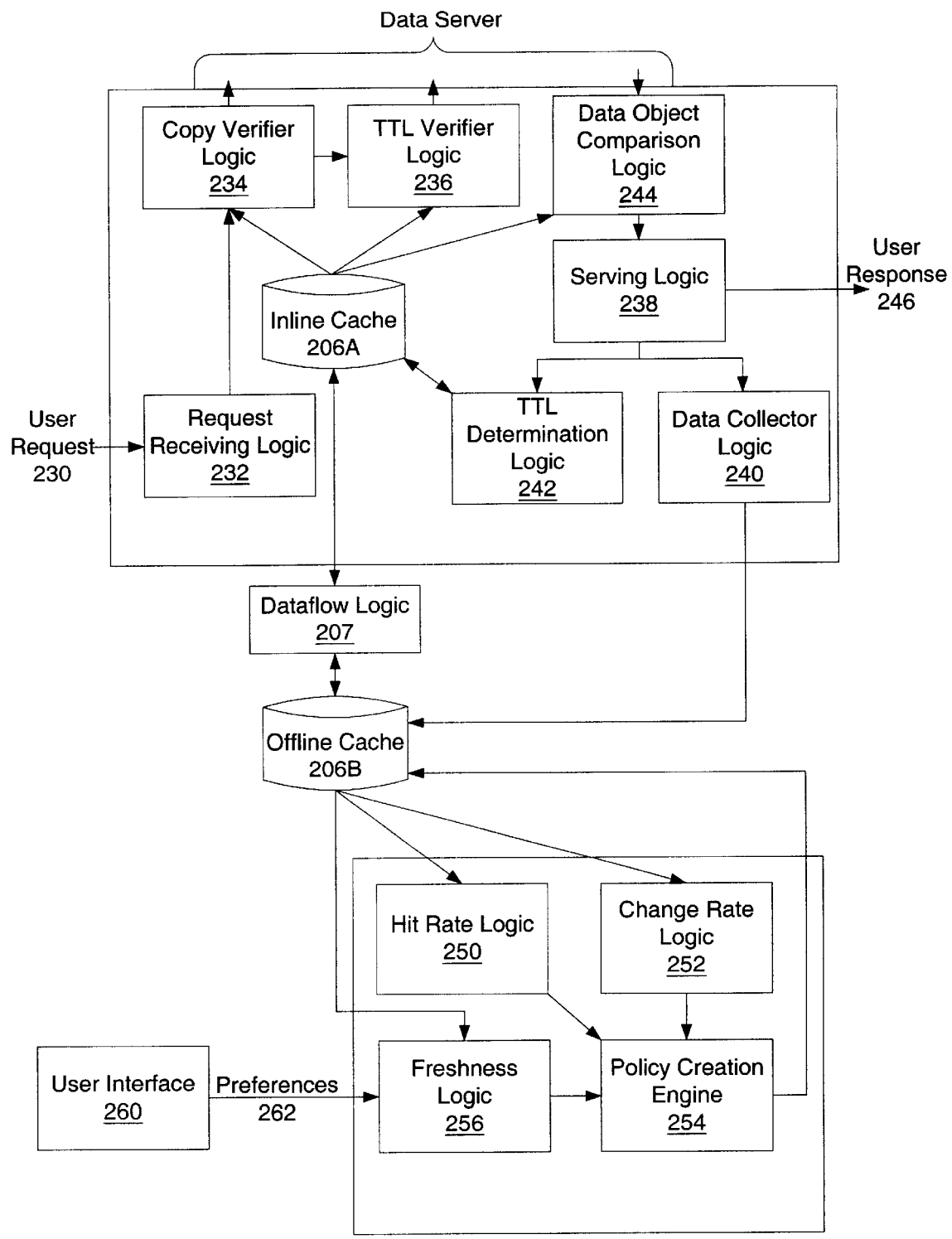
FIG. 2B illustrates a more detailed block diagram of the inline server and the offline server, according to one embodiment of the present invention

FIG. 2B illustrates a more detailed block diagram of inline server 202 and offline server 204 within dynamic application cache server 106, according to one embodiment of the present invention. Inline server 202 comprises request receiving logic 232, copy verifier logic 234, TTL verifier logic 236, serving logic 238, data object comparison logic 244, TTL determination logic 242, data collector logic 240, and inline portion of cache 206A.

Request receiving logic 232 is coupled to receive user requests 230 for data objects. In one embodiment, the user request 230 is received from one of devices 102A–I, as described above. Request receiving logic 232 is coupled to copy verifier logic 234. Copy verifier logic 234 determines whether a copy of the requested data can be found in the inline portion of cache 206A. If no such copy can be found, copy verifier logic 234 passes the request 230 to the data server. Otherwise, the request is passed to TTL verifier logic 236. TTL verifier 236 determines whether the copy in the cache 206A is still valid. If not, it proxies the request 230 to the data server. Otherwise, the request is passed to serving logic 238. Serving logic 238 assembles the page from cache 206A, and serves it to the user, as user response 246.

If the request was proxied to the data server, the response from the data server is received by data object comparison logic 244. The data object comparison logic 244 determines whether the data object received from the data server is identical to the data object in cache 206A. In one embodiment, the data object comparison logic 244 creates the data object for the cache, and performs a checksum operation to determine whether the object retrieved from the data server is different from the object in the cache. This is described in more detail in U.S. patent application Ser. No. 10/143,716, entitled "A METHOD AND APPARATUS FOR A DYNAMIC CACHING SYSTEM", filed on May 9, 2002, now U.S. Pat. No. 6,640,240 and incorporated herein by reference. The TTL determination logic 242 calculates a new time-to-live for the data object in cache 206. Data collector logic 240 collects the relevant data, and passes it to offline server 204, for calculations.

Offline server 204 comprises policy engine 254, hit rate logic 250, change rate logic 252 and freshness logic 256. Freshness logic 256 is coupled to receive preferences 262 from a user through user interface 260. Additionally, freshness logic 256 is coupled to receive a measured freshness from data collector logic 240. Freshness logic 256 is coupled to the offline portion cache 206B and policy engine 254. Freshness logic 256 uses the measured freshness, and user's policies, to create a formula for calculating the time-to-live for data objects. The freshness logic 256 adds the time-to-live equation to the data object in cache 206A, through offline portion of cache 206B and dataflow logic 207, which mediates the dataflow between inline cache 206A and offline cache 206B. The offline portion of the cache 206B includes meta-data about the data in the inline portion of cache 206A. For simplicity, in the remainder of this description, the cache 206 will be simply referenced as a single unit. However, it is to be understood that in one embodiment, there are two separate caches, interfaced by dataflow logic 207. Using separate caches reduces the load, and thereby decreases access times for the cache.

Hit rate logic 250 is coupled to receive hits for data objects from data collector logic 240. Hit rate logic 250 is also coupled to cache 206 and policy engine 254. Hit rate logic 250 calculates the hit rate histogram, used by freshness logic 256 to determine time-to-live equation. Change rate logic 252 is coupled to receive changes for data objects from data collector logic 240. Change rate logic 252 calculates the change rate histogram, used by freshness logic 256 to determine time-to-live equation. Change rate logic 252 is also coupled to cache 206 and policy engine 254. The operations of the different logic blocks within inline server 202 and offline server 204 will be described in more detail below.

Updating of Time-To-Live Periods and Related Statistics

Figure 3:
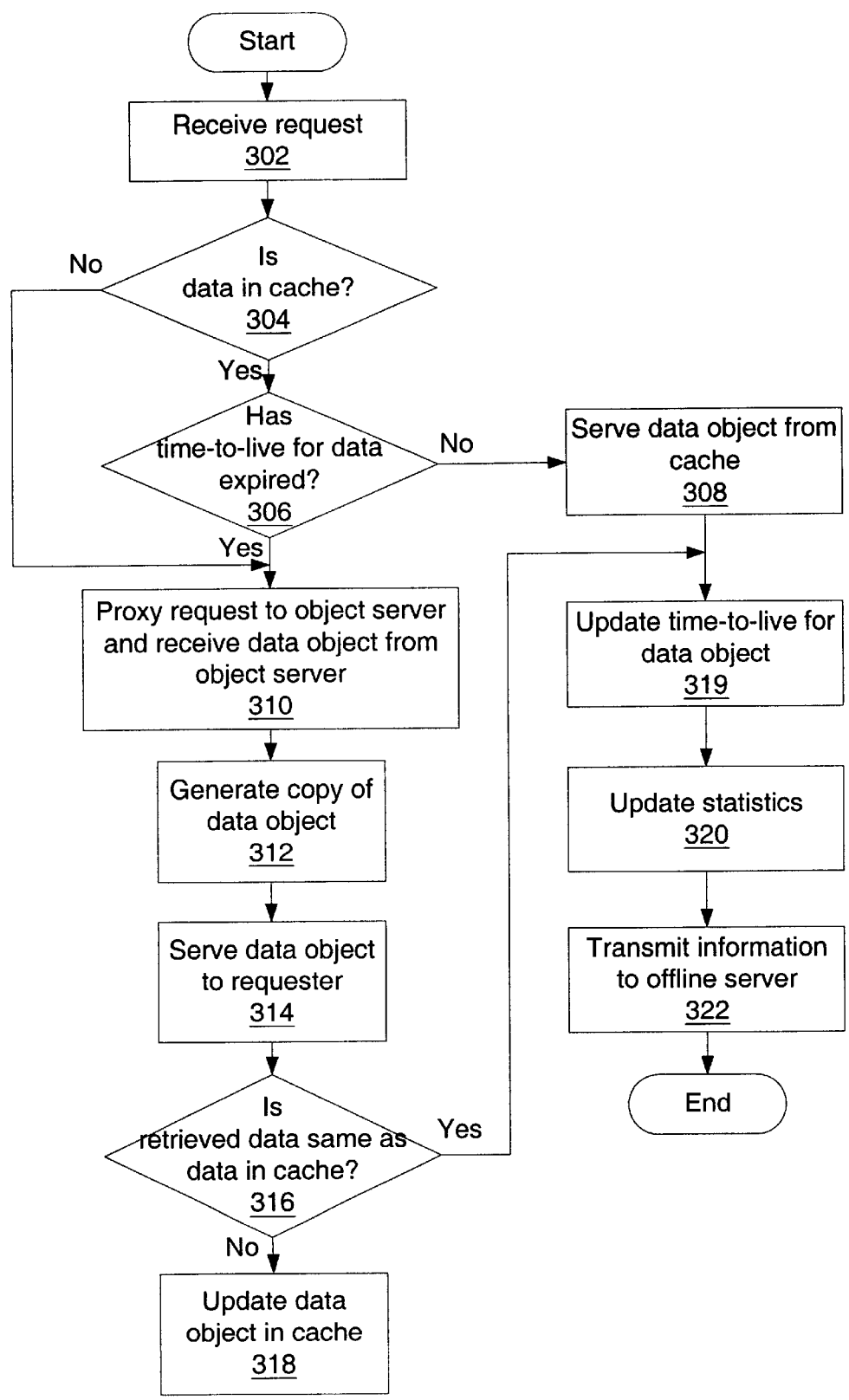
FIG. 3 illustrates a flow diagram for processing a request for a data object and updating a time-to-live period for the object, according to one embodiment of the present invention.

The operations of system 100 will now be described in more detail. FIG. 3 illustrates a flow diagram for processing a request for a data object and updating a time-to-live period for the object, according to one embodiment of the present invention. In an embodiment, the data object can include web pages, portions of web pages, or other data that can be downloaded from a server.

At block 302, flow diagram 300 commences with a request being received for a data object. The request, in one embodiment, is from a user, and is destined for data object server 108, and intercepted by dynamic application caching server 106. In an embodiment, request receiving logic 232 in inline server 202 receives this request for a data object. In one embodiment, this request is transmitted by any of a number of different requesting units. For example, in one embodiment, a requesting unit could include one of devices 102, such as a desktop computer. In another embodiment, the requesting unit could be another server (not shown in FIG. 1A) connecting to data object server 108 through network 104.

At block 304, the system determines whether a copy of the data object exists in cache 206. In an embodiment, copy verifier logic 234 in inline server 202 makes this decision regarding whether the copy of the data object is stored in cache 206. If a previous request for the same data object has been served, a copy of the data object exists within cache 206. In one embodiment, the data object's identity is determined through creation of a unique URL, which incorporates relevant parameters. One embodiment of such a process is described in copending application Ser. No. 10/143,716, now U.S. Pat. No. 6,640,240, incorporated herein.

If the data is in the cache 206, at block 306, a decision is made of whether the time-to-live period associated with the copy of the data object stored in cache 206 has expired. In an embodiment, TTL verifier logic 236 in inline server 202 makes this decision regarding whether the time-to-live period associated with the copy of the data object stored in cache 206 is expired.

At block 308, if the time-to-live period associated with the copy of the data object is not expired, the data object is transmitted back to the requesting unit, without retrieving the data object from data object server 108. In one embodiment, the dynamic data is assembled, as described in copending application Ser. No. 10/143,716. In one embodiment, serving logic 238 in inline server 202 transmits the data object back to the requesting unit. The system then updates the statistics for hit rate for the object, at block 320. At block 322, the information about the hit rate is transmitted to the offline server. The process then ends.

If the copy of the data object was not stored in cache 206 (evaluated at block 304) or the time-to-live period is expired for the copy of the data object (evaluated at block 306), the data object is retrieved from data object server 108, at block 310. In an embodiment, copy verifier logic 234 in inline server 202 causes the retrieval of the data object from data object server 108. In an embodiment, TTL verifier logic 236 in inline server 202 causes the retrieval of the data object from data object server 108. Web server 110 receives the request for the data object. In an embodiment, web server 110 transmits the data object back to dynamic application cache server 106. In one embodiment, web server 110 retrieves the data object from application server 112 and/or database 114. Web server 110 transmits the data object back to dynamic application cache server 106.

At block 312, a copy of the data object received from data object server 108 is generated. In an embodiment, data object comparison logic 244 in inline server 202 generates a copy of the data object received from data object server 108. In one embodiment, data object comparison logic 244 generates a compile object, such that the data object (including both the static and dynamic content) can be reproduced when a subsequent request for such a data object is received. The generation of the compile object is described in more detail in copending application Ser. No. 10/143,716, now U.S. Pat. No. 6,640,240.

At block 314, the data object from data object server 108 is served to the requester. In one embodiment, serving logic 238 in inline server 202 transmits the data object back to the requester.

At block 316, the decision is made on whether the data object retrieved from data object server 108 is identical to the data object stored in cache 206. In one embodiment, the system first removes certain personalization and transient content, prior to performing the comparison. In one embodiment, the comparison is done on a Cyclical Redundancy Check (CRC) of the data object. In an embodiment, data object comparison logic 244 performs this comparison.

At block 318, upon determining that the data object retrieved from data object server 108 is not identical to the data object stored in cache 206, the data object is updated within cache 206. In an embodiment, data object comparison logic 244 updates the data object within cache 206. The process then continues to block 319. If the data object was identical to the data object retrieved from the server, the process continues directly to block 319.

At block 319, the time to live (TTL) of the data object is updated. In one embodiment, TTL calculation logic 242 updates the time-to-live period for the data object in cache 206. The process then continues to block 320.

Conversely, upon determining that the data object retrieved from data object server 108 is the same as the data object stored in cache 206, the data object and the time-to-live period for this data object remain unchanged within cache 206. The process then continues to block 320.

At block 320, statistics related to the data object are updated. In one embodiment, one statistic updated is a value representing a time when the data object was last validated. In an embodiment, this value is set to the current time (validation time, $t_v$, which is described in more detail below in the conjunction with the generation of the time-to-live period for the data object). In an embodiment, a value representing a time when the data object was last changed is also updated, if appropriate. Accordingly, if the data object from data object server 108 and cache 206 were found to be different, this value representing a time when the data object was last changed is set to the current time (change time, $t_c$, which is described in more detail below in the conjunction with the generation of the time-to-live period for the data object).

Figure 5:
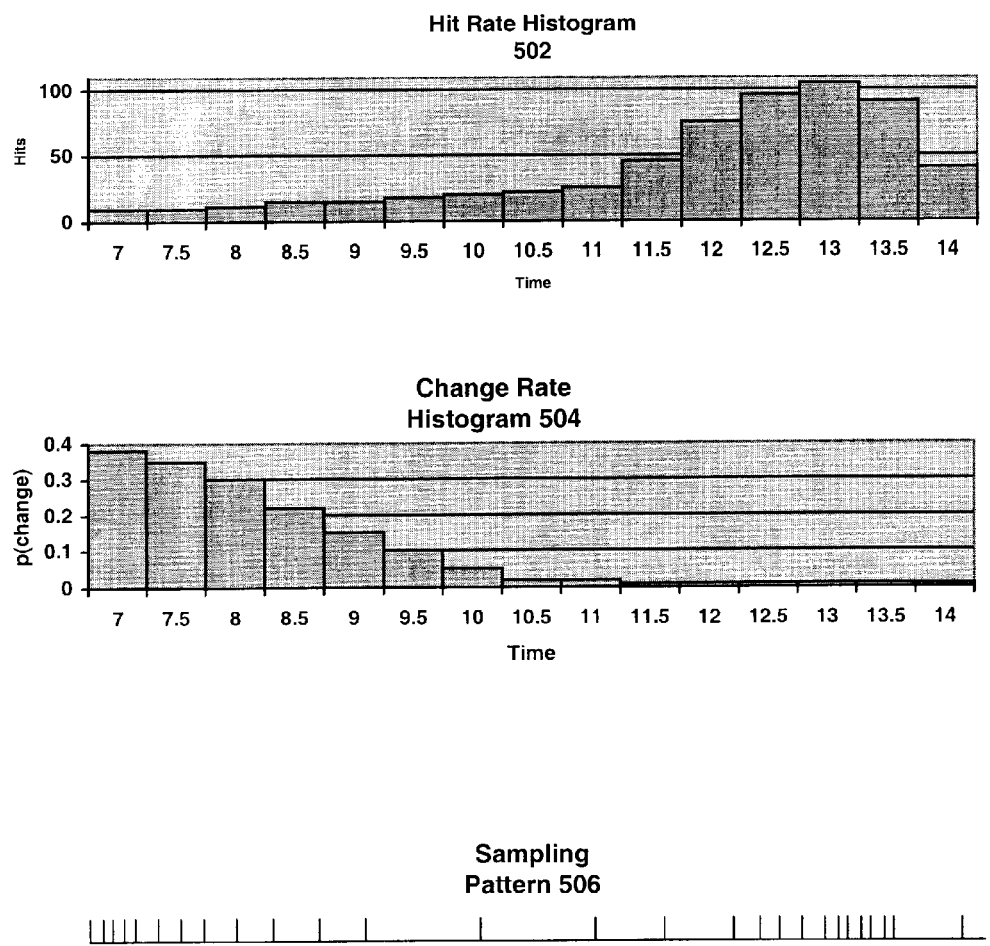
FIG. 5 illustrates histograms of a hit rate and a change rate as well as a sampling pattern for the time-to-live period for a given data object over time, according to one embodiment of the present invention.

In one embodiment, the updating of the time-to-live period for the data object is based on an associated policy for such a data object. In an embodiment, this associated policy is based on the cumulative hit rate distribution for the data object. In an embodiment, a hit rate includes the number of requests (hits) for a given data object being received from any of a number of different requesting units and/or other servers over a given period of time. In one embodiment, the hit rate over time for a given data object is evaluated using a histogram (an example of which is illustrated in FIG. 5, which is described in more detail below).

In one embodiment, initially, there is a "seeding process" that is used to bootstrap the system. The system is based on predictive modeling, as discussed. However, when the system is first initialized no such information exists. In one embodiment, the system uses a seeding data set, to generate a starting point. The seeding data set, for example for change rate may be generated based an update period, a margin of error, and a weight received from the user. Based on these inputs, a simulated change rate curve is generated. This simulated change rate curve is used initially as the bootstrap value for the change rate. Similarly, seed data may be generated for hit rates and other factors in calculating a time-to-live. Then, as actual data is accumulated, each of the values is adjusted to conform to reality. In one embodiment, the seed data may be provided by the user through a policy engine.

In an embodiment, this associated policy for the data object includes the cumulative change interval probability distribution for the data object. In an embodiment, the change rate includes the number of changes that are made to the data object stored in dynamic application cache server 106 over a given period of time. For example, if the data object stored in dynamic application cache server 106 is different from the data object retrieved from data server, dynamic application cache server 106 updates/changes the data object stored in the cache. In one embodiment, the change rate over time for a given data object is evaluated using a histogram (an example of which is illustrated in FIG. 5, which is described in more detail below). The updating of the time-to-live period is described in more detail below with respect to FIG. 4.

At block 320, the relevant details about the data served in response to a request are transmitted to offline server 204. In one embodiment, this data includes the time, whether the data was served from the cache or proxied, and the checksum of the data served. In one embodiment, the data may be the statistics (e.g., $t_c$, $t_v$). In an embodiment, data collection logic 240 in inline server 202 transmits this data to offline server 204. In one embodiment, these statistics include a time associated with the request being received. This data is used by offline server to update the hit rate and change rate for the data object (as will be described in more detail below with reference to FIG. 4). The process then ends.

Figure 4:
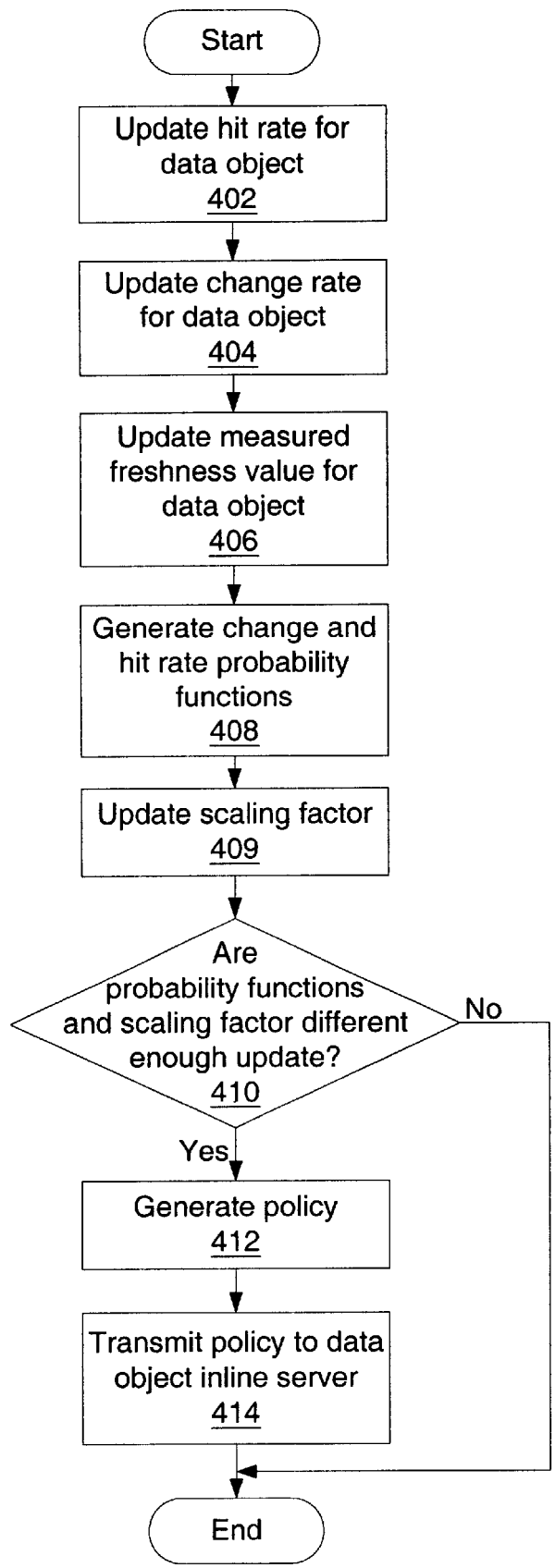
FIG. 4 illustrates a flow diagram for updating a policy for a time-to-live period for a given data object, according to one embodiment of the present invention.

The updating of data (including the hit rate, change rate and scaling factor (based on freshness)) related to a given data object will now be described. FIG. 4 illustrates a flow diagram for updating a policy for a time-to-live period for a given data object, according to one embodiment of the present invention. In one embodiment, flow diagram 400 of FIG. 4 is independent of flow diagram 300 of FIG. 3. In an embodiment, flow diagram 400 is invoked after the data object has been served to the requesting unit. The process shown in flow diagram is performed by offline server 204, asynchronously with the serving of objects by the inline server 202.

At block 402, a hit rate for the data object is updated. In one embodiment, hit rate logic 250 updates the hit rate for the data object. As described above, in an embodiment, a hit rate includes the number of requests (hits) for a given data object being received from any of a number of different requesting units over a given period of time. In one embodiment, the hit rate for the given data object is evaluated using a histogram (an example of which is illustrated in FIG. 5, which is described in more detail below). Accordingly, hit rate logic 250 updates this histogram based on the new data.

At block 404, a change rate for the data object is updated. In one embodiment, change rate logic 252 in offline server 204 updates the change rate for the data object. In an embodiment, the change rate is the number of changes that are made to the data object stored in dynamic application cache server 106 over a given period of time. For example, if the data object stored in dynamic application cache server 106 is considered expired (i.e., the time-to-live period for the data object is expired), dynamic application cache server 106 updates/changes the data object the next time a request is received. In one embodiment, the change rate for a given data object is evaluated using a histogram (an example of which is illustrated in FIG. 5, which is described in more detail below). Accordingly, change rate logic 252 updates this histogram for the change rate.

In one embodiment, the change rate may be based on an absolute change rate, based on the absolute time. The change rate may be relative to an absolute time frame. In one embodiment, the change intervals may be defined with respect to relative time as well as absolute time. This may permit the use of time-of-day as one of the factors of evaluating change rates. For example, a web page displaying stock quotes may have frequent changes during "trading hours" and less frequent changes showing "after hours trading" which absolutely no changes happen during the weekend. Therefore, adding the absolute time-frame for the change rate may be advantageous.

FIG. 5 illustrates histograms of a hit rate and a change rate as well as a sampling pattern for the time-to-live period for a given data object over time, according to one embodiment of the present invention. FIG. 5 includes hit rate histogram 502, change rate histogram 504, and sampling pattern 506. With regard to hit rate histogram 502, the vertical axis shows the number of hits for the given data object, while the horizontal axis shows the time. In one embodiment, as in this example, the time is absolute time, and shows the number of hits at various times. As shown, the number of hits between hours 7 and 11.5 is under 50, while the number of hits between hours 12 and 13.5 is in the range of 50 to 100 hits. The number of hits at hour 14 is again under 50 hits. Accordingly, hit rate histogram 502 illustrates an increase number of hits between the hours of 12 and 13.5.

With regard to change rate histogram 504, the vertical axis represents the number of changes for the given data object, while the horizontal axis represents the time, in hours, for these changes. As shown, the number of changes is between 0.3 and 0.4 for hours 7 and 7.5. The number of changes is between 0.2 and 0.3 for hours 8 and 8.5. The number of changes is between 0.1 and 0.2 for hour 9, while the number of changes is between 0.0 and 0.1 for hours 9.5 through 14. Accordingly, the number of changes is greater from hours 7 to 10 in comparison to the number of changes from hours 10.5 to 14.

Sampling pattern 506 illustrates the distributions of the length of the time-to-live period for a given data object over a period of time. In particular, the length of the time-to-live period is defined by the distance between two points in sampling pattern 506. As shown by sampling pattern 506 for such a data object, the time-to-live periods are shortened during those times when the data object is changing more often and when the number of hits or requests being made for the data is greater. In particular, the time-to-live periods are shorter from hours 7 through 8.5 (due to the change rate) and from hours 12.5 through 13.5 (due to the hit rate) in comparison to the hours 9 through 12 and hour 14.

Returning to FIG. 4, at block 406, a measured freshness value, $F_m$, for the data object is updated. In one embodiment, freshness logic 256 in offline server 204 updates the measured freshness value for the data object. In an embodiment, freshness for a data object includes the percentage of times that the data object that was served by dynamic application cache server 106 (in response to a request from a requesting unit) is identical to the corresponding data object in the data object server 108. For example, if dynamic application cache server 106 receives 1000 requests for a given data object, and the estimation is that during 950 requests the data object stored in dynamic application cache server 106 was up-to-date, the freshness value is 95%. In one embodiment, this measured freshness value for a data object is employed in the generation of a scaling factor, f, which is used to determine time-to-live periods for the given data object. This is described in more detail below.

In an embodiment, the measured freshness value, $F_m$, is based on the number of times the given data object is served to a requesting unit in relation to the timing of the changing of the data object within cache 206 based on the data object stored in data object server 108. In particular, with regard to the measured freshness value, $F_m$, in an embodiment, freshness logic 256 generates this measured freshness value based on a comparison between the data object retrieved from data object server 108 and the copy of the data object stored in cache 206.

If a given data object retrieved from data object server 108 is the same as the copy of the data object stored in cache 206, the copy of the data object stored in cache 206 is considered fresh. Conversely, if a given data object retrieved from data object server 108 is not the same as the copy of the data object stored in cache 206, the copy of the data object stored in cache 206 is considered stale. In one embodiment, if the data object is fresh during two different retrievals from data object server 108, then data objects served between the two retrieval times are also considered fresh, for the purposes of evaluating the freshness value. Thus, 100% of the data objects served would be considered fresh.

Figure 6A:
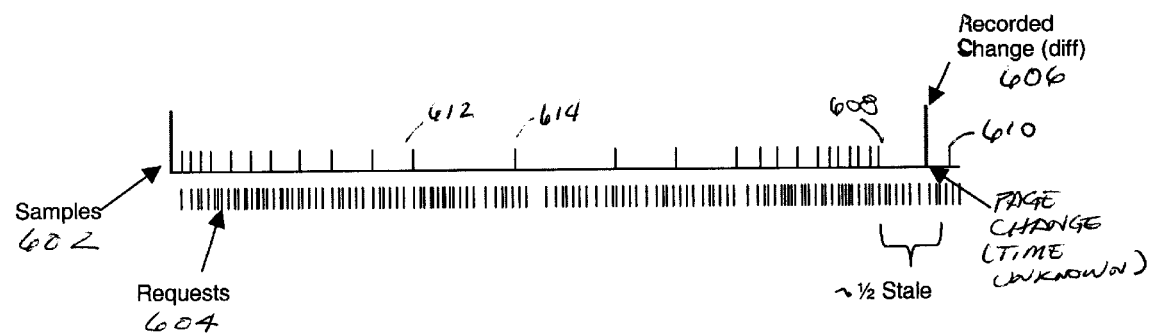
FIGS. 6A and 6B illustrate sampling patterns of the time-to-live periods for a given data object in relation to a request pattern for requests being received for the data object, according to one embodiment of the present invention.

To help illustrate, FIG. 6A includes an exemplary sampling pattern 602 of the time-to-live periods for a given data object in relation to a request pattern 604 for requests being received for the data object, according to one embodiment of the present invention. Request pattern 604 illustrates a pattern of requests for a data object over a given period of time. Sampling pattern 602 illustrates the distributions of the length of the time-to-live periods for the data object over the same period of time. In particular, the length of a time-to-live period is defined by the distance between two points in sampling pattern 602. For example, the time between point 608 and point 610 define a time-to-live period. As shown, a change in the data object occurred at point 606 (a point in between points 608 and 610).

Point 612 and point 614 also define a time-to-live period. As shown, between point 612 and point 614 a number of requests were received and serviced by inline server 202, without retrieving the data object from data object server 108 (as the time-to-live period had not expired). Moreover, as shown, there was no change in the data object between point 612 and point 614. In other words, the data object is verified during two different times (at point 612 and point 614), and therefore, in an embodiment, the requests that are served during these two different times are all considered fresh.

In one embodiment, if the data object is first verified at a first time during a retrieval of the data object from data object server 108 and is changed at a next time a retrieval of the data object from data object server 108 occurs, then one-half of the number of data objects served back to the requesting unit are considered fresh and the other half are considered stale. Thus, because there is a change at point 606 between points 608 and 610, one-half of the requests that are served between point 608 and point 610 are considered fresh, while the other half of the requests that are served between point 608 and point 610 are considered stale.

Figure 6B:
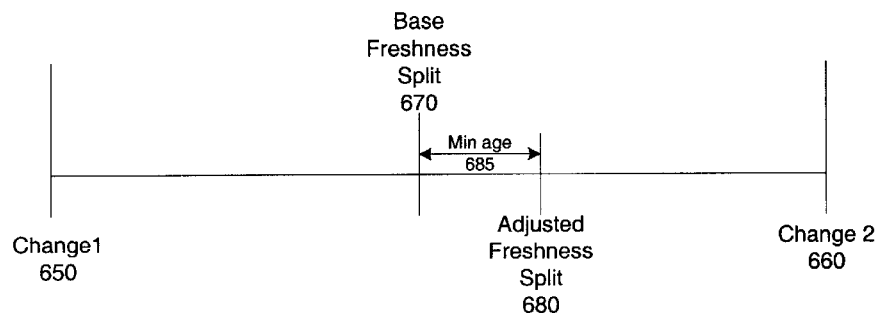

In another embodiment, the data object may have associated with it a "minimum age" or tolerance. In that instance, the objects served within the "minimum age" tolerance of the half-way-point are also considered fresh. FIG. 6B illustrates this. In general, if a first change, at point 650 and a second change at point 660 are detected, the served objects are split evenly, between stale and fresh, at point 670. Note that although point 670 is illustrated centrally, the split, in one embodiment, is based on the number of objects served in the interval between change one and change two, rather than on time. In another embodiment, the split may be based on time. In one embodiment, however, the freshness cut-off is shifted by the "minimum age tolerance." The minimum age tolerance is a value set by the system owner. It indicates a time value for which it is acceptable to serve stale content. For example, the user may indicate that it is acceptable to serve 1 minute old content. Thus, the freshness evaluation shifts from the base split 670 to the base+tolerance split 680. In one embodiment, the tolerance 685 is time-based.

In one embodiment, for a given data object, if the data object is considered changed at a first time during a retrieval of the data object from data object server 108 and is also changed at a next time a retrieval of the data object from data object server 108 occurs, then all requests between these two points are considered stale.

Returning to FIG. 4, at block 406, a measured freshness value is generated. Embodiments of the present invention are not limited to these definitions of fresh and stale in reference to the data objects being served. For example, in another embodiment, if a data object were verified twice, then 95% of the requests being served between the two points would be considered fresh, while the remaining 5% are considered stale. To further illustrate, in an embodiment, if a data object is considered changed for two different points, then 80% of the requests being served between the two points would be considered stale, while the remaining 20% would be considered fresh.

At block 408, the change and hit probability functions are generated.

At block 409, the scaling factor is updated. In one embodiment, the scaling factor, f, is derived from the user freshness value, $F_u$, entered by the user/system administrator/owner of the data object. In an embodiment, the user/system administrator/owner employs user interface 260 (shown in FIG. 2B) to enter the user freshness value (which is one of preferences 262). In one embodiment, the freshness value may not be a single value. Rather, the user may set multiple freshness values, depending on the time-of-day. Thus, for example, the user may set the preference that during working hours (for example 8 a.m. to 5 p.m.) the data must be 95% fresh, but after working hours and on weekends, the data may be 80% fresh. Thus, while for the purposes of this discussion, the value of $F_u$ is assumed to be a constant, it may, in fact vary with time of day. In that instance, during this calculation, the time of day is determined, prior to determining the value of $F_u$. In one embodiment, the freshness value may be adjusted based on the current server load. For example, the user may set the preference that $F_u$=95% if server load is under 90%, while $F_u$=80% if server load is 95%. An arbitrary number of such delineations may be set for the value of $F_u$.

In an embodiment, the scaling factor, f, is derived from a measured freshness value, $F_m$, deduced from statistics received from inline server 202. An embodiment of the generation of this measured freshness value is described above in conjunction with FIGS. 6A and 6B. In an embodiment, the scaling factor, f, is a floating point value.

Based on the user freshness value, $F_u$, and the measured freshness value, $F_m$, offline server 204 updates the scaling factor, f. In one embodiment, the scaling factor, f, is adjusted by a factor proportional to the difference between $F_u$ and $F_m$. In particular, in an embodiment, if $F_m$ is greater than $F_u$, the scaling factor, f, equates to $f_{new}$, wherein $f_{new}$ is based on equation (3):

$$f_{new}=f_{old}*(1+F_m-F_u) \quad (3)$$

Conversely, in an embodiment, if $F_u$ is greater than $F_m$, the scaling factor, f, equates to $f_{new}$, wherein $f_{new}$ is based on equation (4):

$$f_{new}=f_{old}+(f_{max}-f_{old})*(F_m-F_u) \quad (4)$$

wherein $f_{old}$ is the previous value for scaling factor, f, and $f_{max}$ is defined as a largest value of f. In one embodiment, $f_{max}$ is based on equation (5):

$$f_{max}=\text{MaxObservedChangeInterval}^2*\text{Sup}(H'(t)) \quad (5)$$

To help illustrate, assume that the change intervals for a given data object are evenly distributed between 10000 and 11000 milliseconds and that a hit rate for the data object remains constant through a given time period of one week. Accordingly, the value of MaxObservedChangeInterval equals 11000. Additionally, Sup(H'(t)) is based on equation (6):

$$\text{Sup}(H'(t))=1/(\text{period in milliseconds}) \quad (6)$$

In this example, the number of milliseconds in a week equals 6,04,800,000. Therefore, based on equation (5), $f_{max}$ equals 0.20. Moreover, assume that the inputs include $F_u$=0.90, $F_m$=0.85 and $f_{old}$=0.15. Therefore, because $F_u$ is greater than $F_m$, the adjusted scaling factor ($f_{new}$) is 0.145 based on equation (4). Accordingly, the policy uses the cumulative hit rate distribution, H(t) and the cumulative change interval probability distribution, C(q) to calculate the scaling factor, f.

Returning to FIG. 4, at block 410 the process determines whether the new probability functions and scaling factor are different enough from the previous ones for an update. For one embodiment, the system evaluates the distance between the functions. For one embodiment, for the scaling factor, a simple percentage difference is used, and if the percentage is above a threshold, it is considered different enough. For one embodiment, that threshold is 5%. For one embodiment, for the probability functions an L2 function is used. The L2 function, known in the art, is the square root of the integral of $(f_{original}(x)-f_{new}(x))^2$ from A to B. If the L2 function is above a threshold, it is considered different enough.

At block 412, a policy for the data object is generated based on the hit rate, the change rate and a scaling factor based on freshness for the data object. In an embodiment, policy engine 254 in offline server 204 generates a policy for the data object based on the hit rate, the change rate and the scaling factor based on freshness for the data object. With regard to the hit rate, in one embodiment, the policy comprises a cumulative hit rate distribution (H(t)) based on the histogram of the hit rate (an example of which is illustrated in FIG. 5), shown by equation (1):

$$H(t) = \int_0^t h(s)\,ds \quad (1)$$

In one embodiment, the cumulative hit rate distribution is for a one-day period. In another embodiment, the cumulative hit rate distribution is for a seven-day period. However, embodiments of the present invention are not so limited. In other embodiments, the cumulative hit rate distribution can be based on a different time period. In an embodiment, the value t is absolute time, such as the day and time within the day. Moreover, in one embodiment, this cumulative hit rate distribution is normalized to generate values between zero and one.

With regard to the change rate, in one embodiment, the policy comprises a cumulative change interval probability distribution (C(q)) based on the histogram of the change rate (an example of which is illustrated in FIG. 5), shown by equation (2):

$$C(q) = \int_0^q c(s)\,ds \quad (2)$$

In an embodiment, the value of q is the relative time. In other words, the value q is the time since the last recorded change in the data object stored in dynamic application cache server 106.

At block 414, the policy for the data object is transmitted to inline server 202. In one embodiment, policy engine 254 in offline server 204 transmits this policy for the data object to inline server 202. Accordingly, TTL calculation logic 242 in inline server 202 employs this policy in the generation of a time-to-live period for the data object (which is described in more detail below).

As discussed above with respect to block 316 of FIG. 3, the time-to-live period (expiration time) for a given data object is updated. In one embodiment, TTL calculation logic 242 in inline server 202 generates a time-to-live period for a given data object stored in cache 206. In an embodiment, the time-to-live period equals the value of t based on equation (7):

$$f = ((H(t) - H(t_v)) * (C(t - t_c) - C(t_v - t_c)) * (t - t_v) \quad (7)$$

wherein:

- $t_v$ comprises the time that the data object was last validated. In other words, $t_v$ is the time that the data object was checked to see if the data object stored in dynamic application cache server 106 is different/changed from the data object stored in data object server 108.
- $t_c$ is the time since the data object stored in dynamic application cache server 106 was changed/updated based on data object stored in data object server 108.
- $H(t) - H(t_v)$ represents the portion of hits expected during the given period/cycle that are expected to occur between times $t_v$ and t.
- $C(t - t_c) - C(t_v - t_c)$ represents the portion of changes expected to occur after $t_v - t_c$, but before $t - t_c$ have passed since the last recorded change.

In one embodiment, the value of t is determined based on numerical approximation. For this approximation, both H and C are considered to be monotonically increasing functions of t.

Returning to the example for generating the scaling factor, f, an example of the time-to-live period for a data object is now described. When the data object is first stored in the cache, $t_c$ equals $t_v$ equals t0 (the current time). Moreover, for simplicity it can be assumed that the hit rate is constant during the period. Therefore, H(t) has a constant slope and is based on equation (8):

$$H(t) = (1/(\text{period (ms)})) * t \quad (8)$$

Moreover, it can be assumed that there are no changes when t<10000 and when t>11000, and that the change rate is constant between 10000 and 11000. Therefore, C(t) will be based on equations (9)–(11):

| (9)  | C(t) = 0                      | when t < 10000          |
|------|-------------------------------|-------------------------|
| (10) | C(t) = (1/1000) * (t − 10000) | when 10000 <= t < 11000 |
| (11) | C(t) = 1                      | when t >= 11000         |

Therefore, based on equation (7):

$$0.145 = ((H(t) - H(t0)) * (C(t - t0) - C(0))) * (t - t0) \quad (12)$$

When t>t0, if t−t0<10000, then the right hand side of equation (12) equates to zero. Accordingly, t−t0>10000. When t>t0, if t>11000, C(t−t0)=1. Therefore, the right hand side of equation (12) becomes equation (13):

$$(1/(7*24*60*60*1000)) * (t - t0)2 > f_{max} > 0.145 \quad (13)$$

With regard to the interval when 10000<t<11000, equation (14) is generated:

$$0.145 = (1/(7*24*60*60*1000)) * \quad (14)$$
$$(t - t0) * (1/1000) * (t - t0 - 10000) * (t - t0)$$

Therefore, t−t0 equals 10757 with the value of the time-to-live period, t, based on the value of the starting time, t0. Accordingly, a time-to-live period for the given data object is generated, and stored in the cache servers. The time-to-live period is based on a rate that is proportional to (1) how many requests for the data object are expected to be received and (2) the probability that there is going to be a change to the data object.

In one embodiment, the value of t may be adjusted based on various factors. While only a single t is associated with any data object, during the evaluation of the equation, a multiplying factor may be applied. In one embodiment, the time-to-live may be adjusted based on the requester profile—e.g. certain data about the data requester. As discussed above, the unique content identifier (UCI) may be based on the URL and various parameters that result in distinct responses. However, other parameters, which do not cause a different response, may be set by the user to have different levels of freshness. In that instance, there may be a requester factor which is a multiplier for the TTL. For example, the TTL may indicate that a certain data object may be served for 30 seconds. However, the preferences may be set to always serve newer data for a requester that is a subscriber. In that instance, a 0.75 multiplier may be applied, for example. In this way, a single TTL may be maintained, but there may be adjustments to the TTL based on the requester profile. The requester profile may include various factors including: location, time of day, the presence and absence of certain cookies, the referrer, etc.

Thus, a method and apparatus for updating cache objects for dynamic application caching have been described. Although the present invention has been described with reference to specific exemplary embodiments, it will be evident that various modifications and changes may be made to these embodiments without departing from the broader spirit and scope of the invention. For example, embodiments of the present invention have been described such that data related to policy for a data objects (e.g., the hit rate, change rate, etc) are updated asynchronously in relation to the processing of the requests for data objects and the generation of the time-to-live periods for such objects. For example, in another embodiment, at least a portion of this data related to the policy for the data objects could be updated as the requests for data objects are being processed.

Moreover, embodiments of the present invention are described such that the time-to-live periods are for data and logic that represent data objects and that are stored in dynamic application cache servers. However, embodiments of the present invention are not so limited. For examples, in another embodiment, the time-to-live periods could be for the actual data objects that are stored in dynamic application cache servers. Accordingly, the specification and drawings are to be regarded in an illustrative rather than a restrictive sense.

What is claimed is:

1. A method comprising:
   receiving, at a cache server, a request for a data object stored in a data object server;
   determining whether a time-to-live period associated with a copy of the data object stored in the cache server has expired, wherein the time-to-live period is based on a hit rate, a change rate and a freshness for the data object; and transmitting the data object stored in the cache server upon determining the time-to-live period associated with the copy of the data object stored in the cache server has not expired.

2. The method of claim 1, further comprising retrieving the data object stored in the data object server, upon determining that the time-to-live period associated with the copy of the data object stored in the cache server has expired.

3. The method of claim 2, comprising,
generating a new copy of the data object retrieved from the data object server; and
transmitting the data object retrieved from the data object server.

4. The method of claim 3, comprising updating the time-to-live period associated with the data object.

5. The method of claim 4, comprising transmitting characteristics associated with the data object to a different cache server, the characteristics including a hash of the new copy of the data object, and a time when the request was received.

6. The method of claim 5, comprising:
determining if the new copy of the data object is different from the copy of the data object stored in the cache server; and
storing the new copy of the data object in the cache server, upon determining that the new copy of the data object is different.

7. The method of claim 6, wherein the indication that the new copy of the data object is stored in the cache server is used to update the change rate for the data object.

8. The method of claim 5, wherein the time associated with when the request is received is used to update the hit rate for the data object.

9. The method of claim 1, wherein the freshness for the data object comprises a measured freshness value and a freshness value received from an owner of the data object.

10. The method of claim 9, wherein the time-to-live period is adjusted by a scaling factor, wherein the scaling factor is proportional to a difference between the measured freshness value and the freshness value received from the owner of the data object.

11. The method of claim 1, wherein the time-to-live period is shorter when the hit rate is increased for the data object.

12. The method of claim 1, wherein the time-to-live period is shorter when the change rate is increased for the data object.

13. A method comprising:
receiving a hit rate and a change rate for a data object stored in a cache; and
updating a time-to-live period for the data object stored in the cache based on the hit rate and the change rate for the data object.

14. The method of claim 1, comprising,
receiving a freshness value for the data object; and
generating a scaling factor for the time-to-live period based on the freshness value, wherein the time-to-live period is calculated based on the scaling factor.

15. The method of claim 14, wherein the freshness value comprises a measured freshness value and a freshness value received from an owner of the data object.

16. The method of claim 15, wherein the scaling factor is adjusted by a factor proportional to a difference between the measured freshness value and the freshness value received from the owner of the data object.

17. The method of claim 13, wherein the time-to-live period is shorter when the hit rate is increased for the data object.

18. The method of claim 13, wherein the time-to-live period is shorter when the change rate is increased for the data object.

19. The method of claim 13, wherein the cache is coupled to a data object server and wherein the updating of the time-to-live period occurs when the data object is retrieved, by the cache server, from the data object server.

20. A machine-readable medium that provides instructions, which when executed by a machine, cause said machine to perform operations comprising:
receiving a hit rate and a change rate for a data object stored in a cache; and
updating a time-to-live period for the data object stored in the cache based on the hit rate and the change rate for the data object.

21. The machine-readable medium of claim 20, comprising,
receiving a freshness value for the data object; and
generating a scaling factor for the time-to-live period based on the freshness value, wherein the time-to-live period is calculated based on the scaling factor.

22. The machine-readable medium of claim 21, wherein the freshness value comprises a measured freshness value and a freshness value received from an owner of the data object.

23. The machine-readable medium of claim 22, wherein the scaling factor is adjusted by a factor proportional to a difference between the measured freshness value and the freshness value received from the owner of the data object.

24. The machine-readable medium of claim 20, wherein the time-to-live period is smaller when the hit rate is increased for the copy of the data object.

25. The machine-readable medium of claim 20, wherein the time-to-live period is smaller when the change rate is increased for the copy of the data object.

26. A machine-readable medium that provides instructions, which when executed by a machine, cause said machine to perform operations comprising:
receiving, at a cache server, a request for a data object stored in a data object server;
determining whether a time-to-live period associated with a copy of the data object stored in the cache server has expired, wherein the time-to-live period is based on a hit rate, a change rate and a freshness for the data object; and
transmitting the data object stored in the cache server upon determining the time-to-live period associated with the copy of the data object stored in the cache server has not expired.

27. The machine-readable medium of claim 26, further comprising retrieving the data object stored in the data object server, upon determining that the time-to-live period associated with the copy of the data object stored in the cache server has expired.

28. The machine-readable medium of claim 27, comprising,
generating a new copy of the data object retrieved from the data object server; and
transmitting the data object retrieved from the data object server.

29. The machine-readable medium of claim 28, comprising updating the time-to-live period associated with the data object.

30. The machine-readable medium of claim 26, wherein the time-to-live period is shorter when the hit rate is increased for the data object.

31. The machine-readable medium of claim 26, wherein the time-to-live period is shorter when the change rate is increased for the data object.

32. An apparatus comprising:
a database to store a copy of a data object from a data object server and to associate a time-to-live period with the copy of the data object; and
an inline cache server coupled to the data object server, the inline cache server to process requests for data objects destined for the data object server, the inline cache server to serve the copy of the data object if the time-to-live period has not expired, and the inline cache server to update the time-to-live period for the data object based on a hit rate and a change rate for the data object.

33. The apparatus of claim 32, wherein the time-to-live period is based on a measured freshness value for the data object and a freshness value received from an owner of the data object.

34. The apparatus of claim 33, wherein the time-to-live period is adjusted by a scaling factor, wherein the scaling factor is proportional to a difference between the measured freshness value and the freshness value received from the owner of the data object.

35. The apparatus of claim 32, wherein the time-to-live period is shorter when the hit rate is increased for the data object.

36. The apparatus of claim 32, wherein the time-to-live period is shorter when the change rate is increased for the data object.

37. The apparatus of claim 32, comprising an offline server coupled to the inline cache server, the offline server to generate a policy for the data object, the policy based on the hit rate and the change rate for data object, the policy used to calculate the time-to-live period.

38. A system comprising:
a data object server to store data objects; and
a dynamic application cache server coupled to the data object server, the dynamic application cache server to store a copy of data objects, wherein a time-to-live period is associated with the copies of the data objects, the time-to-live periods based on a hit rate and a change rate for the data objects, the dynamic application cache server coupled to receive requests for the data objects from a number of requesting units,
wherein the dynamic application cache server is to output copies of the data objects to the requesting units, without retrieving the data objects from the data object servers, upon determining that the time-to-live periods for the data objects have not expired.

39. The system of claim 38, wherein the time-to-live periods are based on a measured freshness value for the data object and a freshness value received from an owner of the data object.

40. The system of claim 39, wherein the time-to-live period is adjusted by a scaling factor, wherein the scaling factor is proportional to a difference between the measured freshness value and the freshness value received from the owner of the data object.

41. An apparatus comprising:
request receiving logic coupled to receive a request for a data object stored in a data object server from a requesting unit;
copy verifier logic coupled to the request receiving logic and the data object server, the copy verifier logic to determine if a copy of the data object is stored within a database of the apparatus;
time-to-live verifier logic coupled to the copy verifier logic and the data object server, the time-to-live verifier logic to determine whether the time-to-live period associated with the copy of the data object has expired, wherein the time-to-live period is based on a hit rate, a change rate and a freshness for the data object; and
serving logic coupled to the time-to-live verifier logic, the serving logic to transmit the copy of the data object stored within the database to the requesting unit upon determining the copy of the data object is stored within the database and the time-to-live period has not expired.

42. The apparatus of claim 41, wherein the time-to-liver verifier logic is to transmit a request for the data object to the data object server, upon determining that the time-to-live period associated with the copy of the data object has expired.

43. The apparatus of claim 42, further comprising data object comparison logic coupled to the data object server, the data object comparison logic to receive the data object from the data object server, wherein the data object comparison logic is update the copy of data object and the time-to-live period associated with the copy of the data object within the database, upon determining that the copy of the data object is different from the data object received from the data object server.

44. The apparatus of claim 41, wherein the copy verifier logic is to transmit a request for the data object to the data object server, upon determining that a copy of the data object is not stored within the database.

45. A method comprising:
receiving a hit rate that indicates requests for a data object are transmitted to a data object server;
receiving a change rate that indicates the data object is updated within a cache;
receiving a percentage of the data object served by the cache that is identical to the data object in the data object server; and
generating a time-to-live period for the data object stored in the cache based on the rate that the requests for the data object are transmitted to the data object server, and the rate the data object is updated by the data object server, and the percentage of the data object served by the cache that is identical to the data object stored in the data object server.

46. The method of claim 45, wherein the expiration time is shorter when the hit rate is increased.

47. The method of claim 45, wherein the expiration time is shorter when the change rate is increased.

48. The method of claim 45, wherein the expiration time is generated when the data object is retrieved from the data object server.

49. A machine-readable medium that provides instructions, which when executed by a machine, cause said machine to perform operations comprising:
receiving a hit rate that indicates requests for a data object are transmitted to a data object server;
receiving a change rate that indicates the data object is updated within a cache;
receiving a percentage of the data object served by the cache that is identical to the data object in the data object server; and generating a time-to-live period for the data object stored in the cache based on the rate that the requests for the data object are transmitted to the data object server, and the data object is updated by the data object server, and the percentage of the data object served by the cache that is identical to the data object stored in the data object server.

50. The machine-readable medium of claim 49, wherein the expiration time is shorter when the hit rate is increased.

51. The machine-readable medium of claim 49, wherein the expiration time is shorter when the change rate is increased.

52. The machine-readable medium of claim 49, wherein the expiration time is generated when the data object is retrieved from the data object server.

* * * * *